United States Patent [19]
Habisohn

[11] 4,207,508
[45] Jun. 10, 1980

[54] VARIABLE SPEED MOTOR CONTROL SYSTEM

[76] Inventor: Victor J. Habisohn, 252 Englewood Rd., Hoffman Estates, Ill. 60195

[21] Appl. No.: 787,348

[22] Filed: Apr. 14, 1977

[51] Int. Cl.$^{2}$ .................................................. H02P 3/04

[52] U.S. Cl. ..................................... 318/742; 318/779; 318/800; 318/452; 318/285

[58] Field of Search ............... 318/283, 285, 452, 466, 318/467, 742, 779, 800

[56] References Cited

U.S. PATENT DOCUMENTS

| | | | |
|---|---|---|---|
| 3,191,114 | 6/1965 | Reed | 318/447 X |
| 3,248,625 | 4/1966 | Wycoff | 318/742 |
| 3,402,335 | 9/1968 | Smith et al. | 318/800 X |
| 3,678,355 | 7/1972 | Bucek et al. | 318/742 X |
| 3,772,579 | 11/1973 | Stone et al. | 318/742 |
| 4,093,898 | 6/1978 | Morters et al. | 318/800 X |
| 4,097,791 | 6/1978 | Bivens et al. | 318/447 X |

*Primary Examiner*—Gene Z. Rubinson
*Attorney, Agent, or Firm*—Jerome Goldberg

[57] ABSTRACT

A variable speed motor control system for controlling the vertical speed of a hoist. An electro-mechanical brake means locks the hoist load in place when the system is off or when the motor speed is set at a zero speed setting. A quick response circuit is connected into the system for a predetermined time duration after the system is switched from a zero speed to any speed setting (high or low speed), to enable the motor to quickly gain control over the load and prevent the load from slipping as the motor accelerates to the set speed after the brake is released. An initial delay timer is turned on when electrical power is first connected into the system, to prevent transfer of electrical power to the motor and to prevent release of the brake, for a predetermined period of time. A hoist (up-down) electro-mechanical contactor connects electrical power from a source to a thyristor static switch. The system is reset to a start point and the thyristor switch is turned off, when the hoist switch is switched to an off-position but prior to the corresponding line switches breaking their connection with the thyristor switch.

28 Claims, 15 Drawing Figures

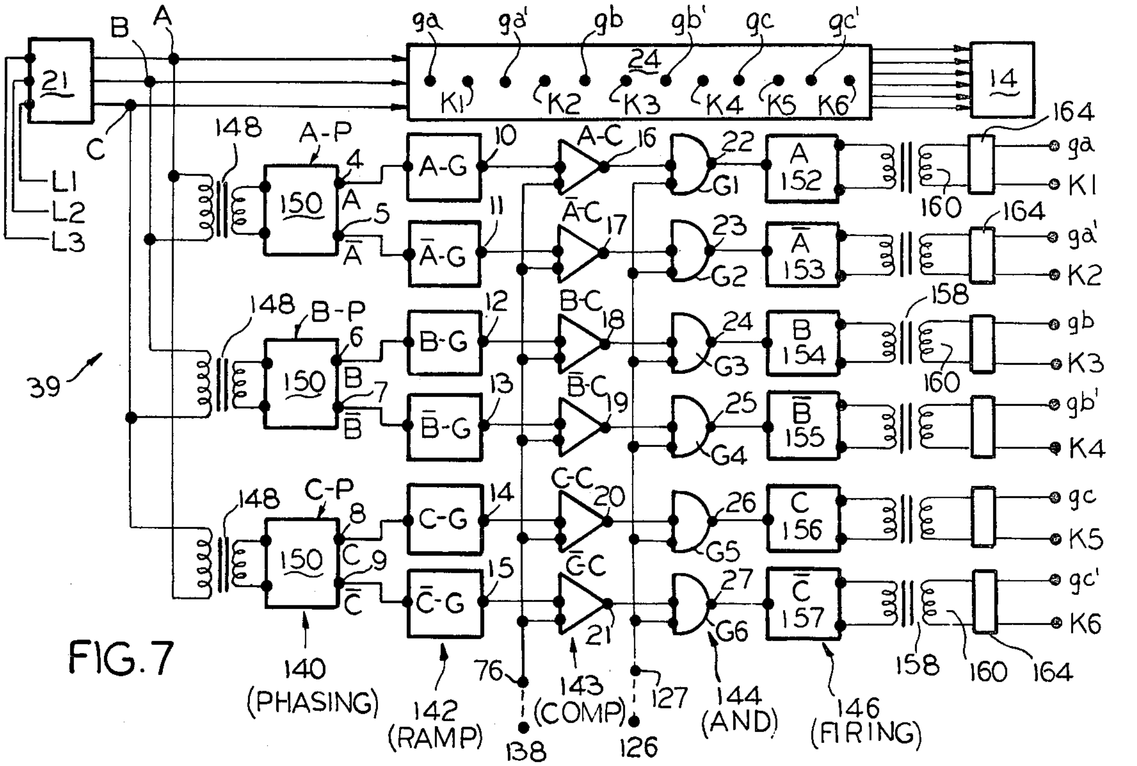
FIG. 7
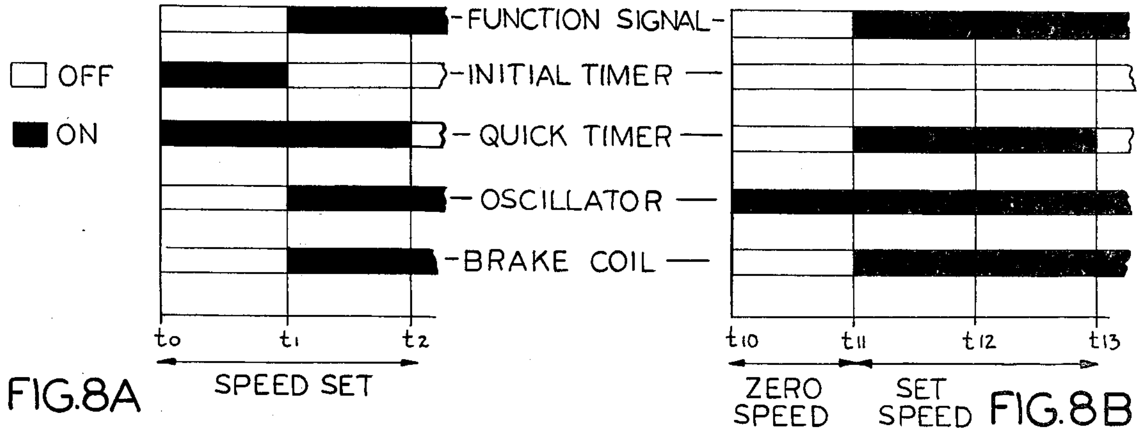
FIG. 8A
FIG. 8B
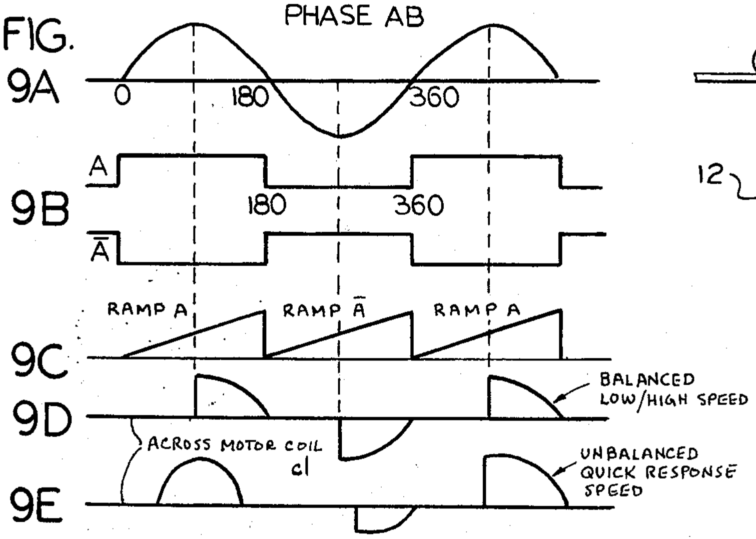
FIG. 9A
9B
9C
9D
9E
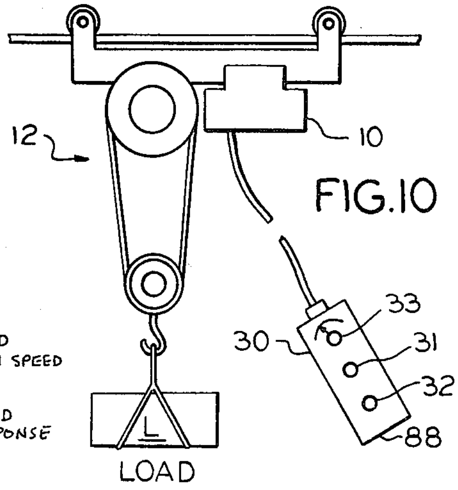
FIG. 10

VARIABLE SPEED MOTOR CONTROL SYSTEM

BACKGROUND OF THE INVENTION

The invention relates generally to a control system for driving an alternating current (AC) motor, and more specifically relates to a variable speed control system for an induction motor. Still more specifically, the invention relates to a variable speed motor control system for controlling the vertical movement of a hoist.

The speed of a squirrel cage induction motor is proportional to the power line frequency, number of poles, and the slip of the motor. The slip of the motor is directly related to the electrical energy applied to the input power terminals of the motor. The torque of the motor is proportional to the square of the voltage applied at the input to the motor. Thus, by varying the voltage magnitude per unit of time applied at the input power terminals, the torque and the speed of the motor can be varied. In the hoist control described herein solid state thyristors are inserted between the input power source and the input power terminals of the induction motor, and voltage to the thyristors are phase controlled. The torque and speed of the motor is varied by varying the time duration of current flow per AC cycle from the source to the motor input power terminals.

A hoist is an invaluable tool for moving loads from one vertical level to another. For example, overhead industrialized trolleys include a hoist assembly for lifting the load located in one location to a safe height, then moving the trolley to a second location, and then lowering the load in place. For fragile or loosely packed material, or smoldering liquids, it is imperative to smoothly lift and lower the load without any jerking or swinging action, and to prevent even slight impact with the ground surface.

In many of the more sophisticated and costly prior hoist systems, loads were softly lifted and lowered in place. However, even in these prior systems, a jerking action would often occur upon varying the hoist speed, and frequently, upon lowering the load, the load would slip away, and, at times, would even impact with the ground. The subject invention overcomes these problems by providing a hoist control system, which controls the locking and releasing of the electro-mechanical load brake to minimize the possibility of a runaway load.

Moreover, the hoist control system of the invention herein further includes automatic quick response means to cause rapid motor reaction when the motor is switched into speed (low or high) from a zero speed condition, and thereby cause the motor to quickly gain control of the load, prior to the occurrence of minimal, if any, load slippage.

It is contemplated that the principles and the various parts of the circuitry of the subject invention are suitable and adaptable for use with other type systems, particularly those systems which require control of the speed of the motor, such as, for example, cranes, conveyors, pumps, fans etc.

SUMMARY OF THE INVENTION

The motor control system of this invention includes an electromechanical brake for locking the load in a fixed position. A power switching network transfers electrical energy from an electrical power source to the motor. A speed adjustment is used to provide a signal corresponding to a desired motor speed. A sensor means provides a sensed speed signal corresponding to the speed of the rotor of the motor. The difference between the sensed speed signal and the set speed signal is an error signal causing a function signal to be generated. The magnitude of the function signal determines the amount of electrical energy being transferred through the switching network per each half cycle of each phase of electrical voltage.

The brake is normally in a locking position, and is released when the switching network is in an on-condition for transferring the electrical power to the motor. The brake switches into the locking-position when the electrical power source is severed from the power switching network and when the speed adjustment is at zero speed.

A quick response network is operatively connected in the system for a predetermined time duration when the motor goes from zero speed to a set operational speed, after the electrical power source is initially connected to the power switching network, and also when the speed adjustment is varied from zero to an operational speed. The quick response network converts the error signals to a train of transient irregular pulses of substantial magnitude between high and low peaks to cause random bursts or surges of energy to be transferred through the switching network to the motor. The imbalance of the electrical energy forces the motor to react quickly to gain mechanical control over the load after the brake has been released. The on time of the quick response network is determined by a quick response timer which is reset when the speed is switched to zero speed and when the electrical power source is switched even momentarily out of the system. Thus, when the system is again activated the quick response action is initiated from the same time point and to remain operative for the same time duration, to ensure that the motor has control over the load, as the speed is increased from zero speed.

Accordingly, it is a parimary object of the invention to provide a motor control system for a hoist that smoothly lifts and lowers a load.

Another object is to provide a motor control system so that a load is softly lowered into contact with the ground.

Another object is to provide a variable speed motor control system.

A feature of the invention is to provide a motor control system including an electromechanical brake which locks a load in place when the electrical power is disconnected from the system and when the system is set at zero speed.

Another feature of the invention is to rapidly bring the motor up to speed in order to gain control over the load and prevent load slippage, when the system is switched from zero speed to an operational speed.

Still another feature of the invention is to reset the system to a start point and to prevent transfer of electrical energy to the motor means when the hoist (up-down) contactor is switched to an off-position but prior to the breaking of the corresponding power line switches from an on to an off position.

BRIEF DESCRIPTION OF THE DRAWINGS

Referring to the drawings in which the same characters of reference are employed to indicate corresponding similar parts throughout the several figures of the drawings:

FIG. 7 is a more detail block diagram of the firing circuit;

FIG. 8A is a graph to illustrate the on-off sequence of system operation between time t0 to t2, when a speed for the system is set and electrical power is initially connected to the system;

FIG. 8B is a graph to illustrate the on-off of the system between time t10 and t11 when the manual speed control is set at zero speed and the on-off of the system between time t11 and t12 after a speed for the system has been set;

FIG. 9A is the phase A to B sine wave voltage of the power source voltage;

FIG. 9B is the phase A and $\bar{A}$

FIG. 9C is the ramp A and $\bar{A}$ voltage;

FIG. 9D illustrates the balanced voltage across the stator coil, when the low or high network is operative in the speed control circuit;

FIG. 9E illustrates the unbalanced voltage across the stator coil when the quick response network is operative in the speed control circuit; and FIG. 10 illustrates a hoist for lifting and lowering a load which is part of an overhead trolley system.

DESCRIPTION OF THE PREFERRED EMBODIMENT

Figure 1:
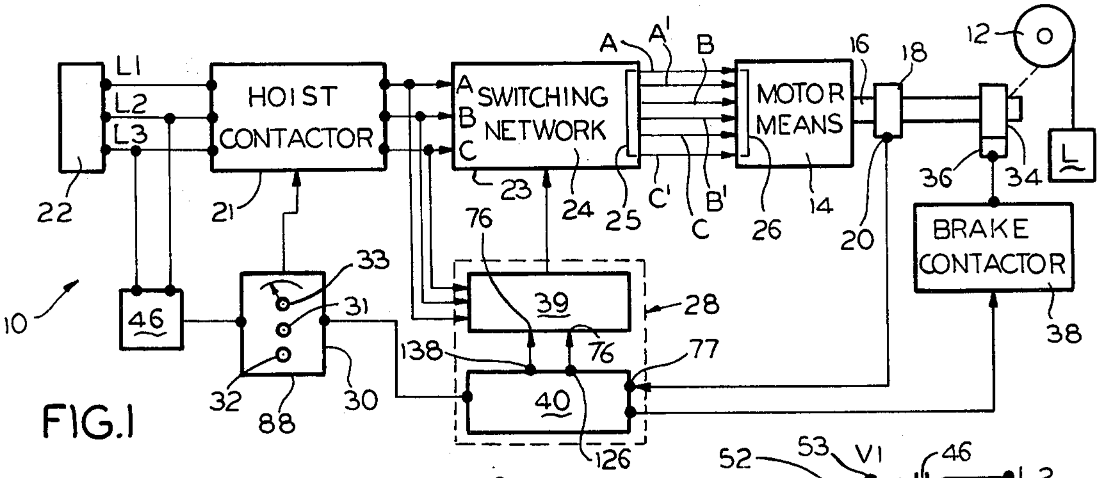
FIG. 1 is a block diagram of a variable speed motor control system for a hoist, embodying the principles of the invention.

Referring now to FIGS. 1 and 10 of the drawings, the reference numeral 10 indicates generally an adjustable speed A.C. motor control system suitable, for example, for driving a hoist 12 in a vertical direction. The control system 10 comprises a three phase motor means 14 driving a rotor 16. A tachometer 18 monitors the rotational speed of the rotor 16 and provides an electrical signal corresponding to the speed of the motor at the output 20.

A hoist contactor means 21 connects electrical power from an alternating current (AC) power source 22 to the input 23 of a static switching network 24. The output 25 of the static switching network 24 is connected to the input 26 of the motor means 14. An operational control means 28 controls the speed of the motor means 14 by varying the electrical energy transferred through the static switching network 24.

The hoist contactor 21 is a three position switch means having a hoist-position, a lower-position, and an off-position. A manual control 30 includes a depressible hoist-button 31 for switching the reversing contactor 21 between the off-position and the hoist-position, a depressible lower-button 32 for switching the hoist contactor 21 between the off-position and the lower-position, and a variable position resistor 33 for varying the speed of the motor means when the hoist contactor 21 is in either the hoist-position or the lower position.

The static switching network 24 has a current conducting state and a current non-conducting state. The hoist contactor 21 connects voltage to the input 23 of the switching network 24 when the switching network 24 is in the non-conducting state. After voltage is connected to the switching network 24, the switching network 24 switches to the current conducting state.

A brake means 34 locks the rotor 16 of the motor 14 in a fixed position, when the hoist contactor 21 is off, or when the switching network 24 is in the non-conducting state and the hoist contactor 21 is in either the hoist-position or the lower-position. The brake means 34 includes a solenoid 36 (FIG. 2) which causes the rotor 16 to lock when de-energized, and unlocks or releases the rotor 16 upon being energized.

A brake contactor 38 controls the energizing and de-energizing of the solenoid 36. When the brake contactor 38 is on, the solenoid 36 is energized for deactivating the brake 34; and when the brake contactor is off, the solenoid is de-energized for activating the brake 34 and locking the rotor 16. The brake contactor 38 is switched on when the switching network 24 is switched to the current conducting state from the non-conducting state.

The operational control means 28 comprises a speed control circuit 40 (FIG. 4) for controlling and varying the vertical travel speed of the load, and a firing circuit 39 (FIG. 5) for switching on the static switching network 24 when the system is in the operational mode for hoisting or lowering the load.

STATIC SWITCHING NETWORK

The static switching network 24 (FIG. 3) comprises three solid state switches 41A, 41B, and 41c. The sequence for switching these switches from an off-condition to an on-condition determines the phases of the power at the output terminals A', B' and C', which, in turn, determine the rotational direction of the motor means 14. Thus, for example, of L1, L2 and L3 are connected to input terminals A, B and C of the switching network 24, the motor 14 rotates in the forward direction when the hoist system 10 is in the hoist mode for lifting the load (hoist contactor 21 is in the hoist-position), provided that the switching network 24 is in the on-condition. If the input power phases are reversed (through hoist contactor 21) the motor 14 rotates in the reverse direction and the hoist system is in the lowering mode for lowering the load.

Each static switch 41A, 41B, and 41C includes a positive current conducting thyristor 42 and a negative current conducting thyristor 43 connected, so that the anode a of the positive thyristor 42 is tied to cathode k of the negative thyristor 43, and vice versa. For positive current flow, when the AC cycle is in the positive portion of the AC cycle, the current flow for each phase, for example, is through the corresponding positive conducting thyristor 42 and the return of electrical flow is through the negative current conducting thyristor(s) 43.

In the negative current flow direction when the AC cycle is in the negative half cycle portion, the current flow for each phase is through the corresponding negative conducting thyristor 43 and the return of electrical flow is through the positive current conducting thristor(s) 42. Thus, there is current flow during both the positive and negative half cycles of the AC cycle, the duration of current flow per each half cycle being determined at the point in the half cycle the corresponding thyristor 42 or 43 is switched on.

Due to the overlapping of the phases, one or more of the thyristors may be condcuting at the same time.

HOIST CONTACTOR

The hoist contactor means 21 (FIG. 2) is a reversing contactor and comprises a three phase power switch contactor section 44, an interlock low power switch section 45, a transformer 46, the hoist push button 31 for energizing and de-energizing the hoist coil 48H, and the lower push button 32 for energizing and de-energizing the lowering coil 48L.

The contactor section 44 includes power line switches 49H, 50H, and 51H for providing electrical phased power for hoisting the load, and power line switches 49L, 50L and 51L for providing the electrical phased power for lowering the load.

The transformer 46 isolates the hoist and lowering coils 48H, 48L from the AC voltage lines L1, L2 on the primary side, and provides the desired control voltage at the secondary side 52 of the transformer 46 for energizing the hoist coil 48H and the lowering coil 48L. Common point 53 of the hoist and lowering coils 48H,48L is tied to one end of the secondary of the transformer 46, and the opposite end of the secondary 52 is tied to terminal 54 common to the hoist and lower push buttons 31,32. Terminal 55 of the hoist push button 31 is connected to the hoist coil 48H, and terminal 56 of the lower push button 32 is connected to the lowering coil 48L.

The low power switch section 45 operates upon the energizing and de-energizing of the hoist and lowering coils 48H,48L, to enable the brake 34 to lock the rotor 16 or release the rotor 16. Switch section 45 includes the hoist switch 57H and the lower switch 57L.

When the hoist pushbutton 31 is depressed, coil 48H is energized, and power switches 49H,50H and 51H switch from the off to the on-position for connecting the forward voltage phases to the input 23 to the switching network 24; and when the lower pushbutton is depressed, coil 48L is energized, and power switches 49L,50L and 51L switch from the off to the on-position for connecting the reverse voltage phases to the input 23 to the switching network 24.

BRAKE CONTACTOR

The brake contactor 38 (FIG. 2) is a single phase reversing contactor and comprises brake/hoist switches 58,59 which switch from an off to a closed-position when the coil 60 is energized, and brake/lower switches 61,62 which switch from the off to the closed-position when the coil 63 is energized. One side of the brake/hoist coil 60 is tied to terminal 55 of the pushbutton switch 31, and one side of brake/lower coil 63 is tied to terminal 56 of the pushbutton switch 32. The opposite side of coil 60 is tied to the hoist switch 57H, and the opposite side of coil 63 is tied to the lower switch 57L.

A static switch 66, which may be a triac switch, includes an input 67 tied to point 53 at the secondary 52 of the transformer 46 and an output 68 tied to the common point 69 of switches 57H,57L. In order for the brake contactor 38 to energize, the triac 66 must be in a conducting state and the hoist contactor 21 must be energized. The speed control means 40 provides the signal at the trigger input 70 for turning on the triac 66.

If the low power switch 57H or 57L is closed, when either coil 48H or 48L respectively is energized, and the triac 66 is on, coil 60 or 63 is energized for closing switches 58,59 or switches 61,62. The solenoid coil is now energized, causing the brake 34 to release the rotor 16, to permit the hoisting or lowering of the load.

Single phase voltage L2,L3 is used for energizing the solenoid coil 36. Voltage L2 is tied to point 72 common to brake switches 58,61, and voltage L3 is tied to point 74 common to brake switches 59,62.

SPEED CONTROL CIRCUIT

Figure 4:
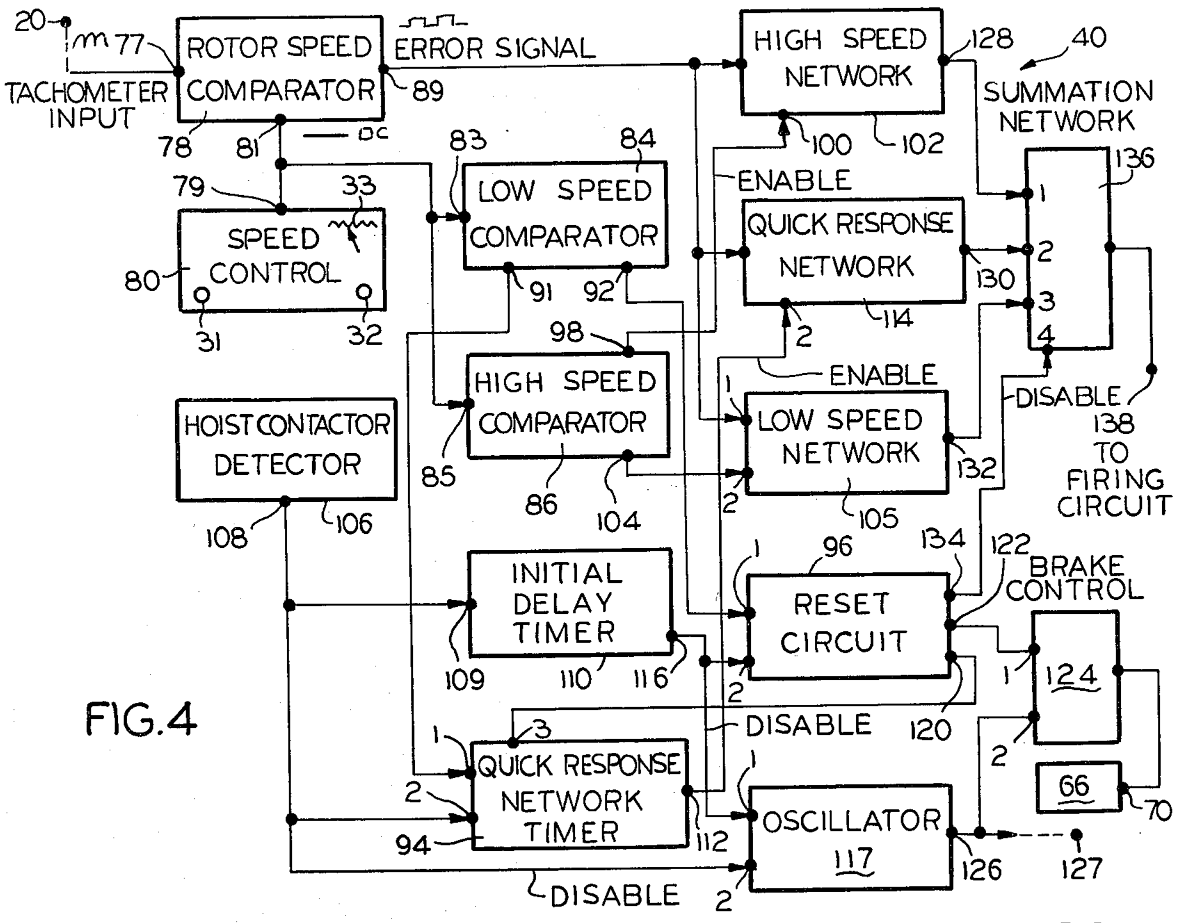
FIG. 4 is a block diagram of the speed control circuit.
Figure 5:
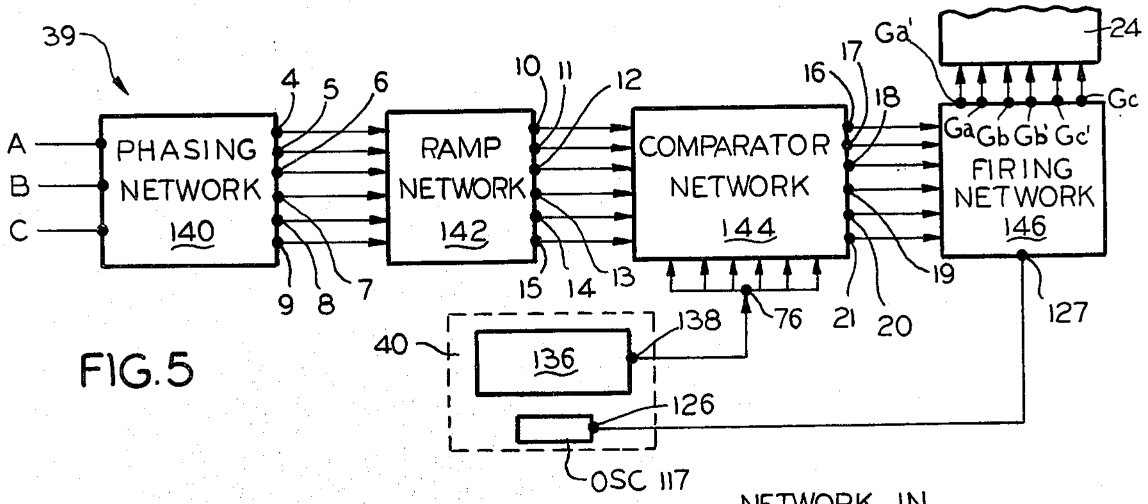
FIG. 5 is a block diagram of the firing circuit.

Referring now more particularly to FIGS. 4 and 5, the speed control circuit 40 translates the electrical rotor speed signals received from the output 20 of the tachometer 18, to electrical time varying signals for coupling to the input 76 of the firing circuit 42.

The electrical rotor speed signals from the tachometer 18 are coupled to the input 77 of a rotor speed comparator 78. The output 79 of the manual speed control 80 is tied to the input 81 to the rotor speed comparator 78, to the input 83 of the low speed comparator 84, and also to the input 85 to the high speed comparator 86.

The manual speed control 80 is adjustable between a minimum speed level and a maximum speed level. If the manual speed control 80 is adjusted lower than the mimimum speed level, the static switching network 24 is turned off, and the electrical power connection is severed from the input 26 of the motor means 14 and also the brake coil 36 is de-energized. The speed control 80 includes the variable resistor means 33 and the hoist and lowering pushbutton switches 31,32, which are mounted in the hand switch casing 88 (FIG. 10). The variation of the variable resistor means 33 provides a DC voltage into the comparators 78,84, and 86, corresponding to the speed of the motor means 14. Thus, the speed of system 10 may be incrementally varied from a minimum speed to a maximum speed.

The low speed comparator 84 includes an output 91 and an output 92. The output 91 is tied to input 1 to a quick response network timer 94, and the output 92 is tied to the inert 1 to a reset circuit 96.

The high speed comparator 86 includes an output 98, which is tied to input 100 of a high speed response network 102 and an output 104 which is tied to input 2 of a low speed response network 105. When the system 10 is in the high speed mode, output 98 provides an enable signal at the input 100 to the high speed network 102, and the output 104 provides a disable signal for coupling to the input 2 to the low speed network 105; and, when the system 10 is in the low speed mode the enable signal at the output 98 is removed and an enable signal appears at the output 104, for coupling to the input 2 of the low speed network 105.

Figure 2:
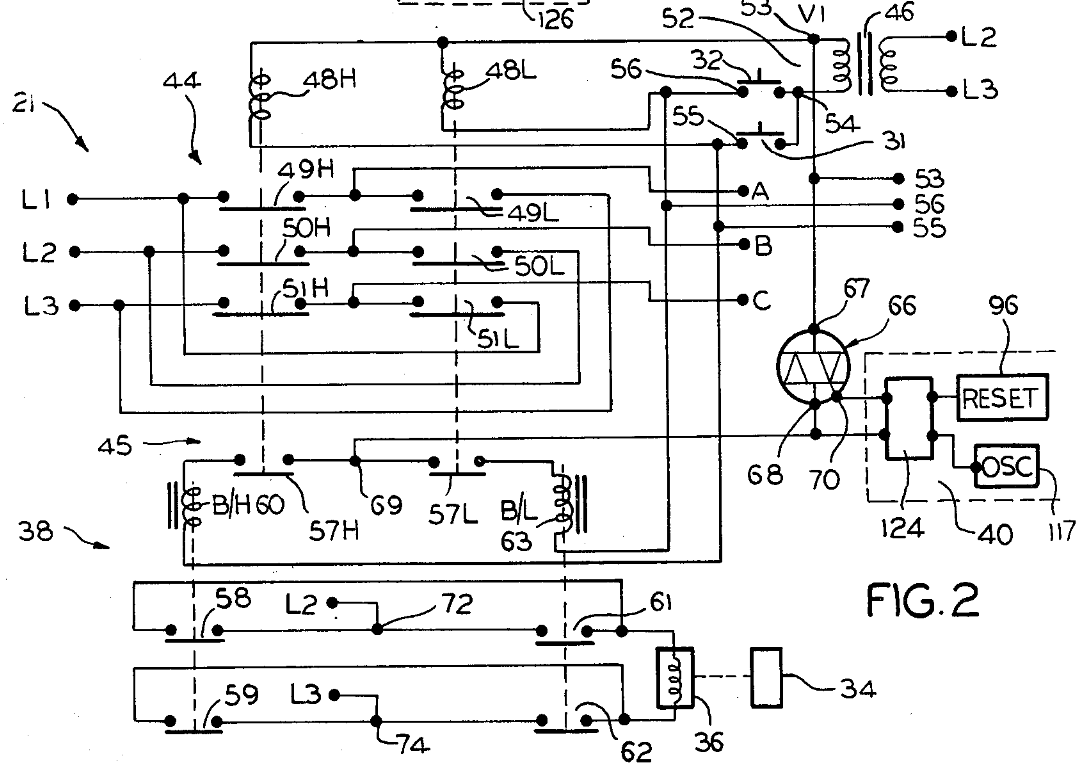
FIG. 2 is a schematic of the hoist contactor and the brake contactor.

An AC contactor detector 106 detects the de-energizing of the hoist contactor coils 48H,48L from the points 55,56 (FIG. 2). The output 108 of the contactor detector 106 is connected to input 109 of an initial delay timer 110, to input 2 of the quick response timer 94, and input 2 of an oscillator 117. The output 112 of the quick response timer 94 is tied to input 2 of the quick response network 124. The output 116 of the initial delay timer 110 is tied to input 1 of the oscillator 117 and also to input 2 of the reset circuit 86.

The output 120 of the reset circuit 96 is connected to input 2 of the quick response timer 94 and output 122 of the reset circuit 96 is connected to input 1 of a brake control 124. The output 126 of oscillator 117 is tied to input 2 to the brake control 124 and to input 127 to the firing circuit 39.

The output 128 of the high speed network 102, the output 130 of the quick response network 114, the output 132 of the low speed response network 105, the output 134 of the reset circuit 86 are connected respectively to inputs 1,2,3, and 4 to a summation network 136. The output 138 of the summation network 136 is coupled to input 76 to the firing circuit 39.

The speed of the motor 14 is determined by the manual setting of the speed control 33. The output 79 of the speed control 80 is direct current (DC) voltage which is compared with the tachometer signal at input 77 to the speed comparator 78. The output 89 of the speed comparator 78 is an error signal which is tied to the quick response network 114, the high speed network 102 and to the low speed network 105. The tachometer signal varies in voltage and frequency.

The low speed comparator 84 is preset to a low DC level corresponding to the lowest speed the system 10 can effectively operate, and compares such low speed level with the speed signal voltage at the output of the manual speed control 80. The low speed comparator 84 is normally in an off-mode and switches to an on-mode when the manual DC level exceeds the preset low DC level.

When the low speed comparator switch 84 is in the on-mode, the output 91 applies an enable signal to the input 1 of the quick response timer 94 to switch the timer 94 on, and the output 92 does not inhibit the reset circuit 96, which switches from the reset to the off-condition. When the low speed comparator switch 84 is in the off-mode, the enable signal at the output 91 is removed, and the output 92 applies a disable signal to the input 1 to the reset circuit 96 to switch it into the reset-condition.

When the high speed comparator 86 is in the on-mode the output 98 applies an enable signal to the input 100 to the high speed network 102, and output 104 applies a disable signal to the input 2 to the low speed network 105. When the high speed comparator switch 86 is in the off-mode, the enable signal at the input 100 to the high speed network 102 is removed, and the output 104 applies an enable signal to the input 2 to the low speed network 105.

When the initial delay timer 110 is on, a disable signal is applied to the oscillator 117 and to the reset circuit 96, to maintain the oscillator 117 off and the reset circuit 96 in the reset-condition during time t0 to time t1 (FIG. 8A). When the delay timer 110 is off the disable signal at output 116 is removed.

When the quick response timer 94 is on, an enable signal is applied to input 2 to the quick response network 114, which is removed when the quick response timer 94 is off.

When the low speed comparator 84 is in the off-mode, the reset circuit 96 is in the on or reset-condition to prevent the brake solenoid 36 from energizing to maintain the brake 34 in a locked-condition for locking the load in place.

If the low speed comparator 84 is switched from the on-mode to the off-mode when the manual speed control 80 is turned to a zero or no speed-position, the reset circuit 96 is switched from an off-condition to the reset-condition to de-energize the brake solenoid 36 causing the brake 34 to lock the load, and also to reset the quick response timer 94.

When the low speed comparator 84 is switched back to the on-mode from the off-mode, an enable signal is connected from the output 91 to the input of the quick response timer 94, to generate an output enable signal for turning on the quick response network 114, and the disable signal is removed from the output 92 thereof to cause the reset circuit 96 to switch from the reset to the off-condition if the initial delay timer 110 is not on.

When the reset circuit 96 is in the reset-condition, the output 120 has a reset signal which is applied to the quick response timer 94, the output 122 applies a disable signal to the brake control 124 to cause the brake 34 to move to the lock-postion, and the output 134 applies a disable signal to the summation network 136. When the reset circuit 96 is in the off-condition, the reset signal to the quick response timer 94 and the disable signals to the summation network 136 and to the brake control 124 are removed. The brake 34 is released, the summation network is operative for controlling the firing of the thyristors 42,43, and the quick response timer starts counting from the same start point.

The hoist contactor detector 106 detects the de-energizing of the hoist contactor coils 48H and 48L (FIG. 2), before the contacts open, and generates a break/disable signal at the output 108, when the hoist contactor 21 is switched from an on to an off-position. The break/-disable signal causes the oscillator 117 to turn off, resets the initial delay timer 110 and also resets the quick respnse timer 94 before the contacts actually open. Thus, even when the operator of the hoist is plugging or inching the load by instantaneous switching of the hoist contactor 21 on and off, the timers always start from the initial start point. Moreover, by turning off the oscillator 117 to prevent firing of the thyristor switches 41A, 41B and 41C for severing the electrical connection between the electrical source 22 and the motor 14, arcing across the switch contacts is prevented when the contactor switches 49, 50 and 51 break.

FIRING CIRCUIT

Referring now to FIGS. 5 and 7 the firing circuit will be described. The firing circuit 39, upon receipt of the function signals from the speed control 40, determines the electrical energy transferred by the switching network 24 from the source 22 to the motor means 14. The firing circuit 39 includes a phasing network 140, a ramp network 142, a comparator network 143, an AND gate network 144 and a firing circuit 146.

The phasing network 140 comprises three phase means A-P, B-P and C-P. Each phase means includes a step down isolation transformer 148 and a cross-over detector network 150 which functions as a differential comparator, for detecting the positive portion of the AC power frequency from the negative portion. The detector network 150 provides a square wave output for the positive portion of the AC voltage and also a square wave output for the negative portion of the AC voltage. The positive portions of the three phase power cycle consisting of phase A-B (phase A), phase B-C (phase B) and phase C-A (phase C) are referred to as A, B and C and the negative portions of the phases are referred to respectively as A-Not ($\overline{A}$), B-Not ($\overline{B}$), and C-Not ($\overline{C}$). The square waves generated at outputs 4 and 5 from phase means A-P are respectively A and $\overline{A}$; from phase means B-P are respectively B and $\overline{B}$; and from phase means C-P are respectively C and $\overline{C}$.

The square wave outputs from the phasing network 140 are referenced with respect to the corresponding sinusoidal inputs at the input points A, B, and C. If the phase of the inputs vary, the phase of the square wave outputs would vary responsively. Therefore, one set of phase relationships is generated when the hoist button 31 is activated and another set of phase relationships is generated when the lowering button 32 is activated.

The ramp network 142 comprises six ramp gates A-G, $\overline{A}$-G, B-G, $\overline{B}$-G, C-G, and $\overline{C}$-G. Output 4 of phase means A-P is connected to ramp gate A-G; output 5 of phase means $\overline{A}$-P is connected to ramp gate $\overline{A}$-G; output 6 of phase means B-P is connected to ramp gate B-G; output 7 of phase means $\overline{B}$-P is connected to ramp gate $\overline{B}$-G; output 8 of phase means C-P is connected to ramp gate C-G; and output 9 of phase means $\overline{C}$-P is connected to ramp gate $\overline{C}$-G. The outputs of the ramp gates of the ramp network are inverted saw tooth signals which are referred to herein as a ramp. The output 10 of ramp gate A-G is a ramp signal A; the output 11 of ramp gate $\overline{A}$-G is a ramp signal $\overline{A}$; the output 12 of ramp gate B-G is a ramp signal B; the output 13 of ramp gate $\overline{B}$-G is a ramp signal $\overline{B}$; the output 14 of ramp gate C-G is a ramp signal C; and the output 15 of ramp gate $\overline{C}$-G is a ramp signal $\overline{C}$.

The ramp signals are 180 degrees out of phase with respect to each other and the period of each ramp is 180 degrees. Since the ramp signals overlap due to their phase variations, one or more of the thyristors of the switching network 24 may be biased into the conduction condition at any one time.

Ramp A starts at the 0 degree point (positive portion) of the phase A voltage cycle; ramp B starts at the 0 degree point (positive portion) of the phase B voltage cycle; ramp C starts at the 0 degree point (positive portion) of the phase C voltage cycle; ramp $\overline{A}$ starts at the 180 degree point (negative portion) of the phase A voltage cycle; ramp $\overline{B}$ starts at the 180 degree point (negative portion) of the phase B voltage cycle; and ramp $\overline{C}$ starts at the 180 degree point (negative portion) of the phase C voltage cycle.

The ramp network 142 converts the square waves corresponding to the positive half cycle of phases A,B. and C into ramps A,B, and C having a minimum or zero point at 0 degrees; and converts the square waves corresponding to the negative half cycle of phases A,B, and C into ramps $\overline{A}$,$\overline{B}$ and $\overline{C}$, having a minimum or zero point at 180 degrees and a maximum point at 360 degrees The comparator network 143 compares the various ramp signals with the summation-function signals at point 136 from the speed control 40. If the function signal is greater than the ramp signal, the corresponding comparator remains off, but if the function signal is equal to or less than the ramp signal, the corresponding comparators switches to an on-state.

Therefore, when the summation-function signal at the output 138 of the summation network 136 has substantial magnitude, less electrical energy is transferred to the motor means 14 per half cycle, as compared to when the function signal has decreased in magnitude. When the function signal at the output 138 of the summation network 136 is of small magnitude, greater (which may be the maximum) electrical energy is transferred to the motor means per each half cycle, to increase the speed of the motor means. No electrical energy will be transferred if the functional signal is greater than the peak voltage of the respective ramps generated by the ramp network 142.

The comparator network 143 comprises six comparators A-C, $\overline{A}$-C, B-C, $\overline{B}$-C, C-C and $\overline{C}$-C. The output 10 from ramp gate A-G is connected to comparator A-C; output 11 from ramp gate $\overline{A}$-G is connected to comparator $\overline{A}$-C; output 12 from ramp gate B-G is connected to comparator $\overline{B}$-C; output 13 from ramp gate $\overline{B}$-G is connected to comparator $\overline{B}$-C; output 14 from ramp gate C-G is connected to comparator C-C; and output 15 from ramp gate $\overline{C}$-G is connected to comparator $\overline{C}$-C.

The comparator network 143 compares the six ramp signals A,$\overline{A}$,B,$\overline{B}$,C and $\overline{C}$ with the function-summation signals at the common input 76 from the output 138 of the summation network 136. If the summation signal is greater than the corresponding ramp signal, no output signal appears at the corresponding comparator outputs 16,17,18,19,20 and 21. If the ramp signal is equal to or less than the function signal, an output signal is generated at the corresponding comparator outputs. Therefore, if the function signal at the output 138 of the summation network 136 is of a large magnitude, the comparator network 143 provides output signals for a small time duration per AC half cycle; and if the function signal is of substantial magnitude, no signal will be generated at the outputs of the comparator network 143. When the function signal at the output 138 of the summation network 136 is small, the comparator network 143 provides output signals for the longest time duration per AC half cycle.

The outputs 16,17,18,19,20 and 21 of the comparators A-C,$\overline{A}$-C,B-C,$\overline{B}$-C,C-C and $\overline{C}$-C, are connected respectively to an input of a corresponding AND gates G1,G2,G3,G4,G4,G5 and G6. The common input 76 to these AND gates are connected to the output 126 of the oscillator 117. The oscillator 117 is cut-off when the initial delay timer 110 is on or when the A-C contactor detector 106 generates an inhibit signal in response to the hoist contactor 21 switching from the hoist or lowering-position to the off-position. When the oscillator 117 is off, the AND gates do not generate output drive signals.

The outputs 22,23,24,25,26 and 27 of the AND gates G1 thru G6 provide a time series of pulses generated by oscillator 117 respectively for the firing means A,152, $\overline{A}$,153,B,154,$\overline{B}$,155,C,156 and $\overline{C}$,157, after the AND gates are switched from a normally off-condition to an on-condition.

The outputs of the firing means 152,153,154,155, 156 and 157 are connected respectively to pulse transformers 158. These pulse transformers 158 provide isolation between the main power lines L1,L2 and L3 and the system 10. The secondary side 160 of each transformer 158 is tied to a rectifier circuit 164, which rectifies the pulses, and the output is tied across the gate g cathode K of the corresponding thyristor switches 42 or 43.

The firing means 152,153,154,155,156 and 157 cause the corresponding thyristor switches 42 or 43 to fire when the corresponding AND gates G1,G2,G3,G4,G5, and G6 are switched on, and the thyristor switches 42 are switched off by the negative portion of the corresponding AC current wave, and the thyristor switches 43 are switched off by the positive portion of the corresponding AC current wave.

MOTOR

Figure 3:
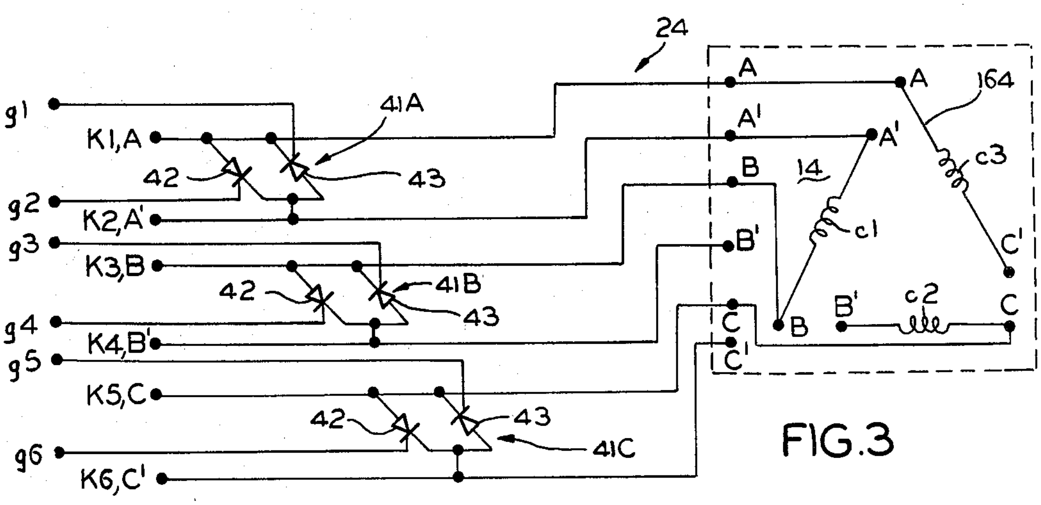
FIG. 3 is a schematic of the static switching network and the stator windings of the motor connected in a delta configuration.

The motor means 14 is an AC induction type motor, which comprises a stator 164 having three coils c1,c2 and c3 for driving the rotor 16. As shown in FIG. 3, the stator coils c1,c2 and c3 are connected together in a delta configuration. The stator coils may also be connected together in a Y configuration.

The motor control system 10 provides forward and reverse phase rotation to the induction motor 14. By phase controlling the voltage to the induction motor 14, increments of line power can be fed to the motor stator windings in order to precisely control the motor speed, from a high speed, which may be desirable for lifting the load, to an extremely low speed for lowering the load just prior to making ground contact.

SEQUENCE OF OPERATION

QUICK RESPONSE NETWORK

When the speed control 80 is set between the mimimum speed level and the high speed level (refer to FIGS. 4,5 and 8) and the hoist contactor 21 is switched from the off-position to either the hoist or lowering position, the initial delay timer 110 is switched on to generate a disable signal for preventing the oscillator 117 from switching on, and also for preventing the reset circuit 96 from enabling the brake control 124. The off-condition for the oscillator 117 prevents the switching network 24 from switching into the conducting state. When the brake control 124 is disabled, the brake 34 is activated for locking the rotor 16 in place and the load is thereby in a fixed and locked vertical level position.

The delay timer 110 is maintained on between time t0 and time t1. When time t1 is reached the delay timer 110 is switched off, causing removal of the disable signal from the output 116, which was coupled to the oscillator 117 and the reset circuit 96. The oscillator 117 is switched on, to permit the firing circuit 42 to switch the switching network 24 from the off-state to the conducting state and the brake control 124 is enabled for releasing the brake 34. Since the system 10 is off line until the hoist contactor 21 is switched from the off to either the hoist or lowering position, a time interval is required to prepare the system for operation.

During time t0 to time t1 the quick response network timer 94 is on, and remains on until a time t2. The output 112 of the quick response timer 94 provides an enable signal, for turning on the quick response network 114 and maintaining the quick response network 114 on between time t0 and time t2.

Effectively, the quick response network 114 is operational between time t1 and t2. The quick response network 114 responds rapidly to the error signals (see FIG. 6) applied at the input 1 from the output 89 of the speed comparator 78, to generate transient type pulses at the output 130 thereof, which is connected to the input 2 of the summation network 136. These transient pulses cause high energy current pulses to pass through the static switching network 24 to the input 26 to the motor means 14, to bring the motor speed rapidly up to the speed set with the speed control 80.

The high energy pulses transferred to the motor means 14 during the time period between t1 and t2, are random bursts or surges of energy passing through the thyristor switching network 24. This transferred energy is not balanced, as the AC cycle goes from positive to negative and visa versa. The imbalance of the 3 phase energy supplied to the motor input 26 forces the motor to react quickly to gain mechanical control over the load L after the brake 34 is released, to prevent the load from slipping.

At time t2, the quick response timer 94 switches off, removing the enable signal from the input 2 to the quick response network 114 and thereby turning off the quick response response network 114.

Therefore, at time t2 the random and unbalanced transfer of electrical energy through the switching network 24 inorder to quickly cause the motor means to respond to the electrical energy input and gain control of the load, is terminated; and after time t2, a more balanced electrical energy is transferred to the input of the motor means in a timed sequence, either in response to the low speed network 105 or the high speed network 102 depending upon the setting of the speed control 80.

LOW SPEED

When the speed control 80 is set at a level between the minimum speed and the intermediate speed, the low speed comparator 84 is switched into the on-mode, applying an on-signal to the input 1 to the quick response timer 94, (which, in turn, switches on the quick response network 114) and applying an off-signal to the input 1 to the reset circuit 96. The high speed comparator 86 is off and applies an off or disable signal to the input 100 to the high speed network 102 (switches to an enable signal when the high speed comparator is in the on-mode).

At time t0 both the quick response network 114 and the low speed network 102 are on, but the signals generated from the error signals are ineffective since the summation network 136 is at reset due to the disable signal from the output 134 of the reset circuit 96, and also because the oscillator 117 controlling the firing circuit 39 is off, due to the disable signal from the initial delay timer 110.

At time t1, the reset circuit 96 is switched from the reset-condition to the off-condition, and the oscillator 117 is turned on and the disable signal is removed from the input 4 to the summation network 136. The error signals at the output 89 of the speed comparator 78 are converted to time varying logic pulses at the output of the quick response network 114, which in turn, cause time varying DC pulses at the output 138 of the summation network 136. The low speed network 105 is also operational during time t1 to t2, but with the quick response network 114 on, the effect of the low speed network 105 is minimal. Large surges of energy are transferred through the switching network 24 to the input 26 of the motor means 14, when the quick response network 114 is controlling the functional output signal from the summation network 136.

At time t2, the quick response timer 94 switches off and thereby removes the enable signal from the input 2 to the quick response network 114. The error signals at the output 89 of the speed comparator 78 are converted to time varying logic pulses having a frequency corresponding to the desired slow speed set with the speed control 80. The time varying logic pulses are converted by the summation network to a functional signal to phase control the firing of the thyristors 42, 43, so that the motor means 14 operates at the set slow speed. Therefore, at time t2 the low speed response network 105 takes over the speed control of the system 10.

If electrical energy had previously been applied to the system 10, and the initial delay timer 110 had operated between t0 to t1, the setting of the speed control 80 to zero switches the low speed comparator 84 to the off-mode. In the off-mode, the output 92 applies a disable signal to the input 1 of the reset circuit 96; causing the reset circuit 96 to switch to the reset-condition, which resets the quick response network timer 94 to zero; disables the the summation network 136; and causes the brake 34 to switch from the release-position to the locked-position.

Figure 6:
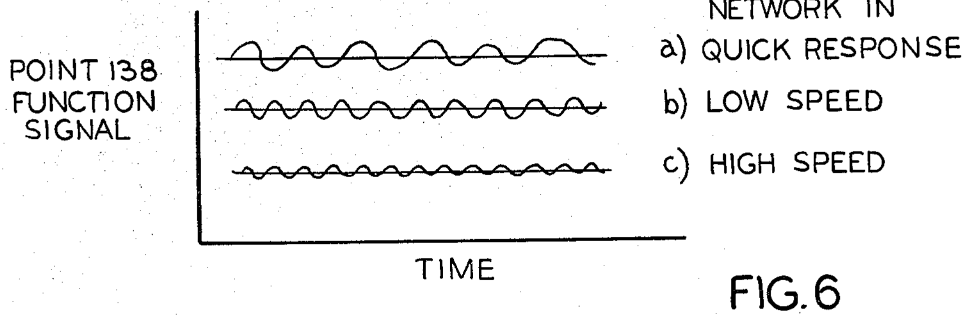
FIG. 6 illustrates the function signals when either the quick response network, the high speed network or the low speed network is operatively connected in the system.

When the speed control 80 is turned from the zero speed to at least the minimum speed point, the low speed comparator 84 is switched into the on-mode, to remove the disable signal from the output 92 to cause the reset circuit 96 to switch from the reset to the off-condition, and the output 91 applies an enable signal to the input 1 to the quick response timer 94. In the off-condition for the reset circuit 96, the brake 34 is released, and the summation network 136 is enabled. The quick response timer 94 is on for a for a predetermined time, which corresponds to the time duration between time t0 to time t2. The quick response network 114 is enabled by the quick response timer 94, and the error signals from the speed comparator 78 are converted to rapid time varying logic pulses coupled to input 2 to the summation network 136. The quick response network 114 is disabled when the quick response timer 94 is switched off. The error signals from the speed comparator 78 are now converted to slower time varying logic pulses having a frequency corresponding to the slow set speed, which appear at the output 138 of the summation network 136, as shown in FIG. 6. Note FIG. 8B for the operation of the system 10 between time t10 and time t13.

HIGH SPEED

When the speed control 80 is set at a level between the intermediate speed and the high speed, both the low speed comparator 84 and the high speed comparator 86 are switched into the on-state. If the electrical power is first being connected to the input 23 of the switching network 24, which is at the time t0, the initial delay timer 110 applies a disable signal to the oscillator 100 and to the reset circuit 96, and no electrical energy is transferred through the switching network 24 and the brake 34 remains in the locked-position. At time t1 the delay timer 110 turns off, thereby removing the disable signal to permit electrical energy to be transferred through the switching network 24 and the brake 34 to be released.

At time t0 both the quick response network 114 and the high speed network 105 are on but the error signals generated are not converted to function signals at the output 138 due to the disable signal from the initial delay timer 110.

At time t1, the reset circuit 96 is switched from the reset-condition to the off-condition, the oscillator 117 is turned on, and the disable signal is removed from the summation network 136 and the brake coil 36 is energized. The low speed network 105 is disabled and the quick response network 114 is operating for converting the error signal pulses from output 89 to the large time varying ripple signals (having an irregular frequency and greater magnitude than the signals generated from the low or high speed network) which finally appears at the output 138 of the summation network 136.

As may be seen from FIG. 8A, at time t0 the function signal and the oscillator are off or disabled, the brake coil is de-energized, and the initial timer is on. The quick response timer is also on but with the function signal off, it has no operative effect. At time t1 the initial timer is switched off, the quick response timer, oscillator and function signal are on, and the brake coil is energized. At time t2 the high speed network 102 becomes the operative error signal response network after the quick response timer 94 is switched off.

If the electrical power from the source 22 had been previously applied to the system and the initial delay timer 110 had operated between time t0 to t1, the setting of the speed control 80 to zero switches the high speed comparator 86 to an off mode. Referring to FIG. 8B, at time t10 the function signal and the quick response timer are off, the brake coil is de-energized. The oscillator 117 is on, but has no effect since the comparator network 143 will not switch on when the function signal is off (voltage of function signal is greater than maximum ramp voltage). At time t11 the function signal and the quick response timer are on, and the brake coil is energized. From time t11 to time t13, the quick response network 114 determines the system operation and brings the motor 14 up to speed in accordance with the tachometer 18 feedback error signal.

At time t13, the quick response timer 94 turns off and the high speed response network 102 determines system operation. When the system is operating at or near the high set speed, the ripple content of the function signal is small as shown in FIG. 6, and consequently, the response to the tachometer error signals is slowest as compared with the low speed or during the quick response period.

TACHOMETER and RESPONSE NETWORKS

The tachometer 18 may be a conventional type, which is secured to the rotor 16 and includes a plurality of magnetic poles, which rotate at the rotor speed of the motor 14 and generate an AC electrical voltage in the tachometer stator windings. As the rotor speed increases the voltage and frequency at the tachometer output 20 increases, and when the rotor speed decreases the voltage and frequency at the tachometer output 20 decreases.

The tachometer time varying signals are compared with a direct current (DC) voltage level set with the manual speed control 80. For low speeds of the motor 14, the DC level is low and for higher speeds the DC level increases to a maximum corresponding to the maximum speed. The rotor speed comparator 78 switches on when the tachometer input signals are less than the set DC level. The output 89 of the rotor speed comparator 78 provides a train of pulses which are of greater frequency for the high motor speed than for the low motor speed. When the average voltage of the pulses per unit of time at the output 89 increases, the functional signal formed in response thereto decreases, to cause more energy to be transferred to the motor means 14. Hence, if greater torque is required the motor speed is less, and the voltage from the tachometer decreases to generate a greater voltage magnitude at the output of the rotor speed comparator 78, which, in turn, decreases the voltage of the function signal responsively, to cause the SCR's to fire sooner during each half cycle for transferring greater energy to the motor 14.

The output AC signals from the tachometer 18 are full wave rectified to provide pulsating DC, as shown in FIG. 4. The signal at input 77 represents the instantaneous signal from the tachometer 18. No external time delay such as external capacitor, is inserted between the tachometer and the comparator 78, so that the feedback signal from the tachometer 18 represents the corresponding instantaneous speed of the rotor 16. The speed comparator 78 switches on if the entire or any portion of the pulsating DC is less than the DC level set with the speed control 80, to provide error signal pulses at the output 89 of a square wave configuration. Generally, the number of output pulses for the high speed is greater than for the low speed per unit of time, and the corresponding voltage per unit of time will be greater for the high speed than for the low speed.

The square wave error signals are converted by the quick response network 114, the high speed network 102 or the low speed network 105, to a DC function signal having ripple content corresponding to the tachometer feedback error signal. The DC level of the function signal is determined primarily by the voltage of the error signals, which sets the point in each phase for the firing of the thyristors of the static switching network 24. Referring now to FIG. 6, the ripple content for the function signals at the output 138 of the summation network 136, is illustrated. When the quick response network is operational, the ripple content is at a maximum; when the high speed network 102 is operational the ripple content is least; and, when the low speed network 105 is operational, the ripple content is less than the quick response ripple content but greater than the low speed ripple content.

When the quick response network 114, is operational, the effective resistance and capacitance (RC) time constant is the smallest, and, therefore, the function signal at the output 138 has the highest ripple content (at the appropriate DC level). Hence, the variations of the error signal are quickly reflected in the function signal. Since the ripple content is high the firing points of the thyristors of the switching network 24 will vary appreciably between phases, causing thereby a wide variation in the energy transferred per each half signal of each phase.

When the high speed network 102 is operational, the effective resistance and capacitance (RC) time constant is the largest and, therefore, the function signal at the output 138 has the least ripple content (at the appropriate DC level). Hence, the variatons of the error signals are not quickly reflected in the function signal, causing thereby a small variation in the energy transferred per each half cycle of each phase. When the low speed network 105 is operational, the effective resistance and capacitance (RC) time constant is larger than when the quick response network 114 is operational, but the RC time constant is less than when the high speed network 102 is operational.

When the motor is at rest, substantial torque is required to bring the motor up to speed for controlling the load and preventing slippage due to gravity. The quick response network by providing a function signal having a wide variation due to the high ripple content, the thyristors of the switching network 24 fire in sequence at random points during each half cycle of each phase, so that during a half cycle of one phase, a large amount of electrical energy may be transferred to the motor, and during a half cycle of the next phase only a small amount of electrical energy may be transferred to the motor. Due to the imbalance of energy transferred to the motor means, the motor is quickly brought up to speed for controlling the load, prior to the load slipping downward due to gravity after the brake 34 had been released. Also, the large amounts of energy transferred to the motor are required to overcome the inertia force when a body is at rest (zero speed).

When the motor is at low speed, appreciable torque is required to enable the motor to retain control of the load, so that a fast response is required but not as fast as when the motor is required to accelerate to a speed from a rest condition. Therefore, a more even balanced transfer of electrical energy is provided at the low speed than during the quick response condition, although due to the high ripple content of the low speed function signal the thyristors of the switching network 24, do not fire at the same point for each phase of the electrical power.

When the motor is at high speed, appreciable torque is generally not required to enable the motor to maintain control over the load. Hence, it is not required to quickly respond, and consequently the low ripple content of the function signal enables the electrical energy transferred to the motor to be substantially balanced (but will have slight variations of the magnitude of the transferred electrical energy for each phase), with less heat generated in the motor as compared to when the energy transferred is not balanced.

The DC level of the function signal is determined primarily by the average error signal voltage. If such error signal voltage is high, the function signal is small and when compared with ramps A,$\overline{A}$,B,$\overline{B}$,C,$\overline{C}$, at the inputs of the comparator network 143, the corresponding comparators will switch sooner to transfer greater power through the corresponding thyristor for the corresponding half cycle, than when the error signal is smaller. Thus, the greater the error feedback signal from the tachometer 18 the greater the portion of each half cycle of energy of phases A,B and C from the source 22 will be transferred to the motor 14.

The description of the preferred embodiments of this invention is intended merely as illustrative of the subject invention, the scope and limits of which are set forth in the following claims.

I claim:

1. A hoist control system for moving a load from one-position to another, comprising:
 - an electro-mechanical brake means having a lock-position for maintaining the load in a fixed position and a release-position to enable movement of the load;
 - a motor means including a rotor for driving the load;
 - a power switching network having an input end and an output end, said output end being coupled to the motor means, said power switching network having an on-condition and an off-condition, electrical power being transferred to the motor means when the switching network is in the on-condition;
 - a voltage switch means having an on-position for connecting an alternating current ("AC") voltage to said system and an off-position for dis-connecting the electrical voltage from the system, said brake means being in the lock-position when the voltage switch means is in the off-position, said voltage switch means being coupled to the input of said power switching network; and
 - a control means coupled to said network and said brake, for maintaining the brake in the lock-position when said voltage switch means is in the on-position and said power switching network is in the off-condition.

2. The hoist control system of claim 1 includes: a variable speed adjustment means for controlling the magnitude of the electrical power transferred to the motor means, said adjustment means including at least a zero speed-position for preventing electrical power from being transferred through the switching network and a low speed-position and a high speed-position, said brake means switching to the lock-position when the voltage switch means is in the on-position and the variable speed adjustment means switches from the high or low speed-position to the zero speed-position.

3. The hoist control system of claim 1 wherein said voltage switch means connects said alternating current (AC) voltage to the input of the switching network in a first direction and in a second direction; and said control means includes a delay means for preventing the power switching network from switching from the off to the on-condition for a predetermined time interval and for preventing the brake means from moving from the lock-position to the release-position during said interval, after said voltage switch means has connected said voltage to the input of the switching network.

4. The hoist control of claim 1, wherein said motor means includes a rotor, and further includes:

sensing means for determining the speed of the rotor; and a variable adjustment means for setting the speed of the rotor, the cooperation of the sensing means and the variable adjustment means providing an error signal for maintaining the rotor speed at substantially the speed determined by the setting of the variable adjustment means.

5. The hoist control of claim 4 includes:

a quick response network coupled to the power switching network, to cause large surges of electrical energy to be transferred to the motor means after the power switching network has switched from the off to the on-condition as compared to the magnitude fo electrical energy transferred to the motor means when the system has substantially reached the speed set by said adjustment means, to enable the motor to quickly react and come up to the desired speed from zero speed after said brake has moved to the release-position.

6. The hoist control of claim 5 includes:

a low speed response network for converting the error signal to low speed drive signal, to cause a portion of each AC cycle to be transferred through the switching network, when the system is in a low speed mode of operation; and a high speed response network for converting the error signal to a high speed drive signal, to cause a larger portion of the AC cycle as compared with said drive signal of the low speed network, to be transferred through the power switching network, when the system is in a high speed mode of operation.

7. A hoist control system for moving a load from one-position to another, comprising:

an electro-mechanical brake means having a lock-position for maintaining the load in a fixed position and a release-position to enable movement of the load;

a motor means including a rotor for driving the load;

a power switching network having an input end and an output end, said output end being coupled to the motor means, said power switching network having an on-condition and an off-condition, electrical power being transferred to the motor means when the switching network is in the on-condition;

sensing means for determining the speed of the rotor;

a variable adjustment means for setting the speed of the rotor, the cooperation of the sensing means and the variable adjustment means providing an error signal for maintaining the rotor speed at substantially the speed determined by the setting of the variable adjustment means;

a quick response network coupled to the power switching network, to cause large surges of electrical energy to be transferred to the motor means after the power switching network has switched from the off to the on-condition, to enable the motor to quickly react and come up to the desired speed from zero speed after said brake has moved to the release-position; and a quick response timer for generating an enable signal only during a predetermined time duration after the power switching network has switched from the off to the on-condition, said enable signal being coupled to said quick response network, said quick response network only being operative when said enable signal is generated.

8. The hoist control of claim 7 includes:

a low speed switch having an on-state for turning on said quick response timer in response to a speed electrical signal corresponding to at least a minimum speed for the motor means.

9. The hoist control of claim 7 includes:

a voltage switch means for connecting AC voltage to the input of the power switching network, said voltage switch means having an on-position and an off-position for respectively connecting and disconnecting AC voltage from the input of the power switching network;

a delay timer means for providing a disable signal for a predetermined time interval after the voltage switch means switches from the off to the on-position; and a reset circuit having an off-condition and a reset condition, said reset circuit enabling said brake to move from the lock-position to the release-position after the reset circuit switches from the reset to the off-condition and maintaining said break in the lock-position when in the reset condition, said reset circuit resetting said quick release timer and maintaining said brake in the lock-position when in the reset-condition, said delay timer being coupled to said power switching network and to said reset circuit so that said disable signal from the delay timer prevents said power switching network from switching to the on-condition and maintains said reset circuit in the reset-condition during said time interval.

10. The hoist control of claim 9, wherein said reset circuit switches from the off-condition to the reset-condition when the system is set at a speed less than a predetermined minimum speed level.

11. A hoist control system for moving a load from one-position to another, comprising:

an electro-mechanical brake means having a lock-position for maintaining the load in a fixed position and a release-position to enable movement of the load;

a motor means including a rotor for driving the load;

a power switching network having an input end and an output end, said output end being coupled to the motor means, said power switching network having an on-condition and an off-condition, electrical power being transferred to the motor means when the switching network is in the on-condition;

sensing means for determining the speed of the rotor;

a variable adjustment means for setting the speed of the rotor, the cooperation of the sensing means and the variable adjustment means providing an error signal for maintaining the rotor speed at substantially the speed determined by the setting of the variable adjustment means;

a quick response network coupled to the power switching network, to cause large surges of electrical energy to be transferred to the motor means after the power switching network from the off to the on-condition, to enable the motor to quickly react and come up to the desired speed from zero speed after said brake has moved to the release-position;

a low speed response network for converting the error signal to a low speed drive signal, to cause a portion of each AC cycle to be transferred through the switching network, when the system is in a low speed mode of operation;

a high speed response network for converting the error signal to a high speed drive signal, to cause a larger portion of the AC cycle as compared with said drive signal of the low speed network, to be transferred through the power switching network, when the system is in a high speed mode of operation; and a high speed switch switch to provide a turn on signal for switching on the high speed network and preventing operation of the low speed network, when the system is in the high speed mode, said high speed switch disabling the high speed response network and enabling the low speed network, when the system is in the low speed mode.

12. A hoist control system for moving a load from one-position to another, comprising:

an electro-mechanical brake means having a lock-position for maintaining the load in a fixed position and a release-position to enable movement of the load;

a motor means including a rotor for driving the load;

a power switching network having an input end and an output end, said output end being coupled to the motor means, said power switching network having an on-condition and an off-condition, electrical power being transferred to the motor means when the switching network is in the on-condition;

a voltage switch means for connecting AC voltage to the input of the power switching network, said voltage switch means having an on-position and an off-position for respectively connecting and disconnecting AC voltage from the input of the power switching network;

a delay timer means tied to the voltage switch means for providing a disable signal for a predetermined time interval after the voltage switch means switches from the off to the on-position to prevent said transfer of electrical power through said switching network;

a reset circuit having an off-condition and a reset condition, said reset circuit enabling said brake to move from the lock-position to the release-position after the reset circuit switches from the reset to the off-condition, said disable signal from the delay timer maintaining said reset circuit in the reset-condition during said time interval; and a low speed switch having an on-state and an off-state, said low speed switch switching from the off-state to the on-state in response to a speed electrical signal corresponding to at least said minimum speed of the motor means, said low speed switch when in the on-state maintaining the reset circuit in the off-condition after said predetermined time interval.

13. A hoist control system for moving a load from one-position to another, comprising an electro-mechanical brake means having a lock-position for maintianing the load in a fixed position and a release-position to enable movement of the load;

a motor means including a rotor for driving the load;

a power switching network having an input end and an output end, said output end being coupled to the motor means, said power switching network having an on-condition and an off-condition, electrical power being transferred to the motor means when the switching network is in the on-condition;

a hoist switch having an on-position for connecting AC voltage to the input of the switching network in a first direction and in a reverse direction to control rotation of the motor means, said hoist switch having an off-position for disconnecting said AC voltage;

a quick response network coupled to the power switching network for causing large surges of electrical energy to be transferred to the motor means after the power switching network has switched from the off to the on-condtion;

a quick response timer for generating an enable signal only during a predetermined time duration, said enable signal being coupled to said quick response network; and reset means for resetting said quick response timer to a start point when said hoist switch is switched from the on to the off-position.

14. The hoist control system of claim 3 includes:

generating means to provide an enable signal to permit said power switching network to switch to the on-condition from the off-condition;

a plurality of line switches for connecting and disconnecting said AC voltage from the input of the power switching network; and said reset means switching to the reset condition to remove said enable signal of said generating means for preventing said power switching network from switching from the off to the on-condition when said hoist switch is switched to the off-position but prior to said line switches disconnecting said AC voltages from the input of the switching network and when the system is set at a speed less than a predetermined minimum level.

15. A method for controlling the operation of a hoist control means including a mechanical brake and a motor means, for moving a load between two vertical points, and said method comprises:

connecting alternating current (AC) voltage to a power control means;

preventing electrical energy transfer for a delay period through the power control means and thereby preventing transfer of electrical energy to the motor means driving the load;

applying an electrical speed signal to cause at least said motor to operate at a minimum speed after said delay period:

locking the brake for maintaining the load in a fixed position during said delay period; and releasing the brake after said delay time period when said speed signal is being applied.

16. The method of claim 15 includes:

removing said electrical speed signal to cause the motor means to decrease to zero speed; and locking said brake to maintain the load in place when said speed signal signal is removed.

17. The method of claim 16 further includes:

applying said speed signal; and releasing said brake means.

18. A method for controlling the operation of a hoist control means for moving a load between two vertical points, and said method comprises:

connecting alternating current (AC) voltage to a power control means;

preventing electrical energy transfer for a delay period through the power control means and thereby preventing transfer of electrical energy to the motor means driving the load;

applying an electrical speed signal to cause at least said motor to operate at a minimum speed;

locking the brake for maintaining the load in a fixed position during said delay period; and releasing the brake after said delay time period when said speed signal is being applied;

sensing the speed of the motor means;

causing the system to quickly respond to a variation of the speed of the motor means and said speed signal for a predetermined duration of time; and causing the system to respond less quickly to the variation of the speed of the motor means and said speed signal after said time duration.

19. The method of claim 18 includes:

starting a timer to permit said quick response for said time duration;

removing the speed signal so that the motor decreases toward zero speed;

reset said timer after said speed signal is removed; and restarting said timer when said speed signal is again applied.

20. A method for controlling the operation of a system including a motor, and said method comprising:

applying an electrical speed signal to set the speed of the motor means to at least a minimum speed;

starting a timer for a predetermined time duration;

causing the system for said time duration to quickly respond to the variation of the speed of the motor and said speed signal to quickly bring the motor speed up to the set speed;

removing said speed signal;

resetting said timer after the electrical signal is removed; and restarting said timer when said speed signal is applied to cause said said quick response.

21. The method of claim 20 includes:

disconnecting electrical power from the system; and resetting said timer when disconnecting said electrical power.

22. A method for controlling the operation of a system including a motor, and said method comprising:

applying an electrical speed signal to set the speed of the motor means to at least a minimum speed;

starting a timer for a predetermined time duration;

causing the system for said time duration to quickly respond to the variation of the speed of the motor and said speed signal to quickly bring the motor speed up to the set speed;

removing said speed signal;

reseting said timer after the electrical signal is removed;

restarting said timer when said speed signal is applied to cause said quick response;

generating balanced three phase electrical power, whereby the phase angle between each phase is substantially equal;

transferring electrical power from said generated power to said motor;

causing said power transferred during said time duration to be of a transient nature whereby the period of energy transfer during each phase and the magnitude of electrical power vary randomly; and causing said power transferred after said time duration to be balanced between the phases.

23. A hoist control system for moving a load from one position to another, comprising:

an electrical-mechanical brake means having a lock-position for maintaining the load in a fixed level and a release-position to enable movement of the load;

a motor means for driving the load;

a power switching network having input and output ends, said output end being coupled to the motor means, said switching network having a current conducting-condition for transferring electrical power to the motor and an off-condition;

switch means having an on-position for connecting electrical voltage to the input of the power switching network and an off-position for severing said electrical voltage;

a delay means for preventing said brake from moving to the release-position and preventing the power switching network from switching from the off to the current conducting-condition for a predetermined time after said switch means is switched from the off to the on-position; and speed means associated with the power switching network and having a zero speed condition and a speed condition, said brake means switching to the lock-position when the speed means is switched from the speed condition to the zero speed condition and said switch means is in the on-position.

24. The hoist control system of claim 23 includes:

a speed sensor for sensing the speed of the motor means and providing an electrical sensed signal corresponding to the speed of the motor means;

an adjustable speed means for generating a speed signal for setting the speed of the motor means from a minimum speed to a maximum speed; and function means coupled to the speed sensor and the adjustable speed means to provide a function signal responsive to the sensed signal and the set signal, for determining the magnitude of elctrical power transferred through the power switching network to the motor.

25. The hoist system of claim 23 includes a three phase electrical power source and said power switching network includes three pairs of thyristors for conducting electrical current respectively during each phase of electrical current, each of said pairs of thyristors including one thyristor for conducting electrical current during the positive portion of the current cycle of one of said phases and the other thyristor of the pair for conducting electrical current during the negative portion of said current cycle;

a tachometer for sensing the speed of the motor means and providing a corresponding electrical sensed signal; and speed means for generating an electrical speed signal corresponding to a desired speed for the motor, the variation of the sensed signal from the speed signal determining the magnitude of electrical energy transferred through the pairs of thyristors.

26. A hoist control system for moving a load form one position to another comprising:

an electro-mechanical brake means having a lock-position for maintaining the load in a fixed level and a release-position to enable movement of the load;

a motor means for driving the load;

a power switching network including an input and an output and having an off-condition and a current conducting-condition for transferring electrical power from the output to the motor means; and switch means having an on-position for connecting electrical voltage to the input of the power switching network and an off-position for severing said electrical voltage; and speed means for varying the speed of the motor means from zero by causing the magnitude of said power transferred through said switching network to vary, said brake means switching from a release-position to a lock-position when the speed means is switched from the increased speed to the zero speed.

27. A motor control system comprising:

a motor means for driving the load;

a power switching network having input and output ends, said output end being coupled to the motor means, said switching network having a current conducting-condition and an off-condition;

a speed means for varying the speed of the motor means from zero speed to an operating speed;

a quick response network to cause large surges of electrical energy to be transferred to the motor means after the power switching network has switched from the off to the conduction-condition, to cause the motor to quickly react and come up to the speed set with said speed means; and a quick response network timer for generating an enable signal during a predetermined time duration, said quick response network only being operative when said enable signal is generated, said timer generating said enable signal for said time duration after said speed means is varied from zero speed to at least a minimum operating speed.

28. The motor control system of claim 27 includes:

reset means for resetting the quick response timer after said speed means is varied from an operating speed to zero speed.

* * * * *